Figure 1:
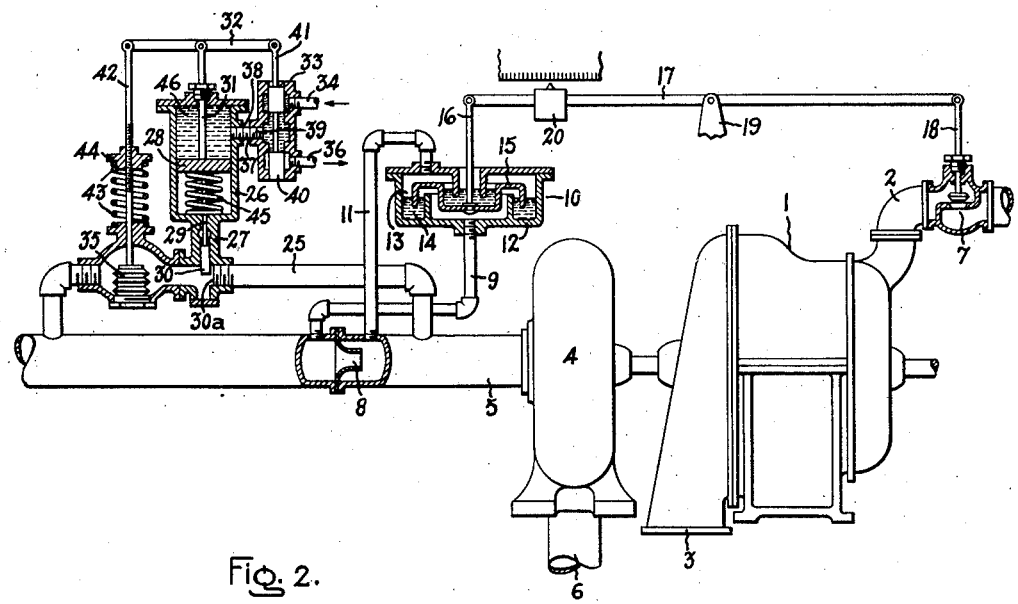

Sept. 27, 1932.    R. G. STANDERWICK    1,879,575
BAROMETER AND TEMPERATURE CORRECTING MEANS
AND CONSTANT VOLUME GOVERNOR
Filed March 5, 1931

Inventor:
Reginald G. Standerwick,
by Charles E. Tullar
His Attorney.

Patented Sept. 27, 1932

1,879,575

UNITED STATES PATENT OFFICE

REGINALD G. STANDERWICK, OF MARBLEHEAD, MASSACHUSETTS, ASSIGNOR TO GENERAL ELECTRIC COMPANY, A CORPORATION OF NEW YORK

BAROMETER AND TEMPERATURE CORRECTING MEANS AND CONSTANT VOLUME GOVERNOR

Application filed March 5, 1931. Serial No. 520,330.

This invention relates to constant volume governors used in connection with gas handling machines such as centrifugal compressors. More specifically the invention relates to a means used in connection with such constant volume governors for controlling the same in accordance with variations in barometric pressure and temperature.

These constant volume governors ordinarily regulate the machine to deliver a constant volume of air or other gas at all times. However, it quite often is the case that what is desired is not a constant volume of the air or gas but a constant weight thereof, due to the fact that a certain percentage by weight of the constituents of the air or gas must be delivered at all times by the machine for efficient operation. It is well known that in a fixed volume of air or gas, the weight thereof will change depending on variations in barometric pressure and in the temperature of the air or gas. These variations in pressure and temperature have been used to operate the constant volume governor to control the volume of air or gas delivered, by changing the volume delivered to that which under the changed conditions of pressure and temperature will have the same weight as the original volume had under predetermined or standard conditions of temperature and pressure. The constant volume governor is usually set so that the required volume of air or gas at a certain pressure and temperature will be delivered by the machine. If the pressure and temperature of the air or gas changes it is necessary to change the volume delivered, correspondingly, in order that the same weight of air or gas will be delivered regardless of the volume. The volume required under definite conditions of temperature and pressure is usually obtained by a setting of the governor control and when these conditions change, the setting of the governor is likewise changed so that the machine will operate to deliver the new volume of air or gas required under the changed conditions of temperature and pressure which will have the proper weight. With my correcting means, however, the constant volume governor will be operated to cause the machine to deliver the required volume of air or gas without changing the setting of the governor.

The object of the invention therefore is to provide a correcting means for constant volume governors, which means will correct for variations in barometric pressure and temperature of the delivered air or gas without changing the setting of the governor.

One application of my invention is in connection with turbine driven centrifugal compressors, and in the present application I have elected to illustrate specifically this application of my invention. It is to be understood, however, that this is only by way of example and that my invention is not limited thereto except when specifically so stated in the claims.

For a consideration of what I believe to be novel and my invention, reference is had to the following description and the claims appended thereto.

Figure 2:
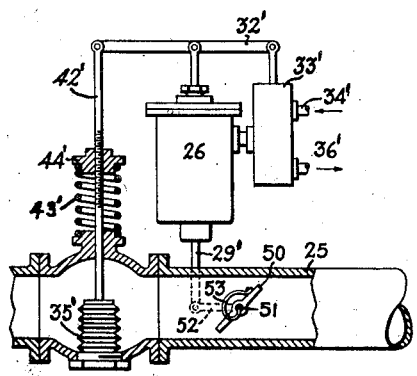

In the drawing, Fig. 1 is a diagrammatic view showing a constant volume governor for a turbine driven centrifugal compressor provided with a correcting mechanism embodying my invention; Fig. 2 is a detail view of a modification.

Referring to the drawing, 1 indicates an elastic fluid turbine provided with an inlet conduit 2 and an exhaust conduit 3. A centrifugal compressor 4, driven by the turbine is provided with an inlet conduit 5, and a discharge conduit 6. In the conduit 2 is a valve means 7 for controlling the admission of elastic fluid to the turbine. In the inlet conduit 5 of the compressor is a pressure-difference creating device 8 of known construction which creates a difference in pressure which bears a definite relation to the rate of flow in conduit 5. In the form shown the pressure-difference creating device is a flow nozzle. The high pressure or leading pressure side of flow nozzle 8 is connected by a pipe 9 to the underside of an actuating device 10, while the low pressure or trailing pressure side of the flow nozzle is connected by a pipe 11 to the upper side of the actuating device 10.

This actuating device 10 functions to open or close the valve 7 to admit, or to cut off the admission of, elastic fluid to the turbine. In its simplest form, the actuating device consists of a casing 12 in which is an annular chamber 13 containing a sealing liquid 14. In the casing 12 is an inverted bell 15, the edges of which are sealed in the sealing liquid, the bell being connected by rod 16 and lever 17 to the valve stem 18. The lever 17 is pivoted at one end to the rod 16 and at its other end to the valve stem 18, and is pivoted intermediate its length to a fixed support 19. At 20 is indicated a weight movable along a fixed scale to set the mechanism for the desired volume of flow.

If the volume of air or gas passing through the flow nozzle 8 either increases or decreases, the bell 15 will be raised or lowered according to the change in volume, to lower or raise valve 7, and the speed of the turbine will be either decreased or increased accordingly to drive the compressor slower or faster, thereby bringing the volume of air or gas delivered back to normal value.

The construction so far described forms no part of the present invention, it being a more or less diagrammatic illustration of a known type of constant volume governor such as is disclosed in my Patent 1,729,692, granted October 1, 1929, whereby a constant volume of air or other gas is delivered.

While a certain volume of gas will be of a definite weight at a certain temperature and pressure, the same volume will have a different weight under changed conditions of temperature and pressure, and in order to provide for the supplying of a constant weight of air or other gas, I provide my correcting means to the above-described structure which changes the volume of air or gas delivered by the compressor so that the weight thereof remains constant. That is, the volume of air or gas delivered by the compressor is changed to a greater or lesser volume, depending on temperature and barometer readings, to maintain the weight of air or gas delivered, constant.

In the compressor inlet conduit 5, there is placed a by-pass, as shown at 25, which by-passes the flow-nozzle or main orifice 8. The bypass 25 forms in substance another suction conduit connected to the compressor at a point beyond the device 8 as regards the direction of flow of fluid. With such an arrangement air may be supplied to the compressor without passing through device 8. Located in the by-pass is a hermetically sealed bellows diaphragm 35 containing air or other gas under "standard conditions", which may be assumed to be a barometer reading of 29" of mercury and a temperature of 60° F. Mounted on a support 27 having connection with the by-pass pipe adjacent the diaphragm, is a cylinder 26 containing therein a piston 28. From one side of the piston, a rod 29 extends through the cylinder casing and through the support 27. On the free end of this rod there is mounted a valve 30 which extends into the by-pass pipe to open or close the opening in said pipe, thus forming an auxiliary orifice 30a in the by-pass pipe. From the other side of the piston there extends a rod 31 which projects from the cylinder casing and has pivoted to it a rod 32. Mounted adjacent the cylinder 26 is a pilot valve structure comprising a valve housing 33 provided with an inlet port 34 for the admission of oil, and with an outlet port 36 for the discharge thereof. Oil is supplied to the port 34 from any suitable source (not shown). Valve housing 33 communicates with cylinder 26 through ports 37 and 38 connected by a short conduit 39. In the valve housing is contained the sliding valve 40 which controls the admission of oil to the cylinder 26 or its discharge therefrom. The stem 41 of the valve is connected to one end of the rod 32. Projecting from the diaphragm 35 through the by-pass pipe, is a stem 42 which is connected to the other end of the rod 32. On the stem 42 is threaded a collar 44 and a compression spring 43 surrounds the stem and is held in place between the collar 44 and the by-pass pipe. The collar 44 can be adjusted to vary the compression of the spring 43. Located in the cylinder 26, between the piston and the cylinder wall and surrounding the rod 29 is a spring 45 which normally tends to raise the piston. The cylinder is normally filled, above the piston, with oil as shown at 46.

With the parts in the position shown in Fig. 1, a volume of air or gas which is at so-called "standard" conditions of pressure and temperature and of a definite weight will be delivered by the machine, and this volume is such, that no actuation of the constant volume governor takes place. Likewise the valve 30 controlling the auxiliary orifice 30a is in its neutral position so that the turbine is running at the speed desired and the compressor is handling the volume of fluid for which the constant volume governing mechanism is set, which is the combined value of the volumes through the by-pass and through the orifice 8. Assume now that there is a change in either the pressure or the temperature of the air or gas, or a change in both the pressure and the temperature. The volume will remain the same but the weight thereof will change due to the change in temperature and pressure. Therefore in order to restore the weight of the air or gas to the original required weight, it is necessary to change the volume being delivered. Ordinarily this was accomplished by changing the setting of the governor so that the machine would deliver a new volume of air or gas, the weight of which would be equal, under the new conditions of pressure and temperature to the weight of the original volume of air or gas, at the so-called "standard" conditions. With the use of my correcting means, however, it is not necessary to change the original setting of the constant volume governor.

Since the diaphragm 35 contains air or gas under "standard" conditions, if there is a decrease in the pressure of the air or gas being delivered, the pressure on the outside of the diaphragm will be less than the pressure inside of it, so that the diaphragm will expand and raise the stem 42. This will cause rod 32 to pivot about rod 31 and the valve 40 will be moved downwardly to establish a connection between ports 37 and 36, thus permitting oil to flow out of cylinder 26 above the piston 28. Spring 45 will thereupon move the piston upwardly carrying the valve 30 with it. This results in the flow of a larger volume of air or gas through the by-pass to the inlet conduit. Since the speed of the machine has not changed, the volume delivered by the machine will have its original value. However, since this value is equal to the volume of flow through the by-pass and the volume through the orifice, it follows that with an increase in the volume of flow through the by-pass there will be a decrease in the volume of flow through the main orifice. This decrease through the main orifice results in a change in pressure difference at the nozzle 8 and the governor is actuated to raise the valve 7, causing the turbine to speed up to thereby restore the volume through orifice 8 to its original value. The volume through the main orifice and the increased volume through the by-pass thus combine at the inlet end of the compressor to give that volume which under the decrease in pressure will have the same weight as the original volume under standard conditions.

On the other hand, if there is an increase in pressure the diaphragm 35 will collapse and the valve 30 will be moved downwardly to close the orifice 30a thereby diminishing the volume of flow through the by-pass. Since the combined volume of the flow through the by-pass and the flow through the orifice is constant, it is apparent that with a decrease in the volume of flow through the by-pass there will be an increase in the volume of flow through the orifice 8, and this increase in flow will result in a change in the pressure-difference which will actuate the governor to lower the valve 7 to diminish the speed of the turbine, whereupon the volume of flow through the main orifice will be restored to its original value, which when combined with the decreased volume of flow through the by-pass will result in a volume which, under the increase in pressure, will have the same weight as the original volume under standard conditions. Thus with an increase in pressure, a volume of air or gas which is less than the original volume under standard conditions but which will have the same weight will be delivered by the machine.

With changes in temperature the correcting means will function in the same manner. With a decrease in temperature the bellows or diaphragm will collapse and the valve 30 will move downwardly to decrease the volume of flow through the by-pass causing the constant volume governor to be actuated to close the valve 7 to lessen the speed of the turbine, while with an increase in temperature the diaphragm will expand to move the valve 30 upwardly and the constant volume governor will be actuated to raise the valve 7 to increase the speed of the turbine.

In Fig. 2 there is shown a modification embodying another means for operating the valve in the by-pass in response to variations in temperature. As shown in this figure the valve 30 is replaced by a valve 50 of the butterfly type, the parts of the valve operating structure being otherwise the same as shown in Fig. 1. The valve 50 is loosely mounted on a rotatable shaft 51 having bearings in the walls of the by-pass 25. Rigidly connected to the shaft is a short arm 52 the free end of which is pivotally connected to the free end of the rod 29'. A thermostatic strip 53 composed of a section of bi-metal has one end connected to the valve 50 while the other end is rigidly secured to the shaft 51. This strip acts in the manner of a thermostat, i. e. it is affected by changes in temperature so that it will expand and contract in response thereto, thereby rotating the valve 50, the valve being moved toward closed position when the temperature of the air or gas decreases, and toward open position when the temperature increases. In this form of the invention the hermetically sealed bellows diaphragm 35' is exhausted, the inside thereof being a vacuum. The diaphragm is maintained in expanded position, as shown in Fig. 2, against the action of the atmospheric pressure tending to collapse it, by means of the spring 43', the tension of which is adjusted to correspond to a predetermined atmospheric pressure by means of the adjustable collar 44'. The diaphragm 35' will thus be collapsed upon an increase in atmospheric pressure to lower the rod 29' and will be expanded by means of the spring 43' upon a decrease in atmospheric pressure to raise the rod 29'. Movement of the rod 29' in response to changes in pressure will rotate the shaft 51, which through the connection of the spring 53 to the valve 50, will also cause the valve 50 to rotate. In addition, since the valve 50 is loosely mounted on the shaft 51, it is free to rotate relative thereto under the action of the spring 53. Thus with changes in pressure of the air or gas being delivered, the diaphragm 35' will cause the rod 29' to be actuated to rotate the valve 50 while due to changes in temperature of the air or gas the valve 50 will also be rotated by the expansion and contraction of the bi-metallic spring 53.

It is accordingly apparent that by the use of the above described apparatus I have provided a means for controlling the action of the constant volume governor in response to variations in atmospheric conditions without changing the setting thereof. The provision of the auxiliary orifice and the valve controlling said orifice results in a means for changing the flow through the main orifice from which the indications to the constant volume governor are obtained without in any way changing the setting of the constant volume governor. The constant volume governor can be set once for the required volume of air or gas under standard conditions and variations in such conditions will be taken care of by the correcting apparatus without changing the setting of the governor.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:—

1. The combination with a turbine driven compressor having a governing mechanism adapted to be set to cause the compressor to deliver a constant volume of fluid under fixed conditions of temperature and pressure, the mechanism including a pressure-difference-creating device comprising a flow responsive device in the inlet conduit of said compressor, said governing mechanism being actuated by variations in pressure-difference, of means responsive to any variations in the conditions of temperature and pressure for varying the volume of fluid delivered without changing the setting of said governing mechanism, said means comprising a by-pass for said flow responsive device, a valve controlling the volume of flow through said by-pass, and a sealed diaphragm in said by-pass, containing a definite amount of fluid for causing movement of said valve, said diaphragm being responsive to variations in temperature and/or pressure of the supplied fluid.

2. In combination with a centrifugal compressor having a suction conduit, a prime mover for driving the compressor, flow responsive means including a device in the suction conduit for causing a predetermined volume of fluid being supplied to the compressor, and means including another suction conduit connected to the compressor at a point beyond the device as regards the direction of flow of fluid for varying the volume of fluid supplied to the compressor in terms of a condition of the fluid.

3. In combination with a centrifugal compressor having a main suction conduit, a prime mover for driving the compressor, a flow responsive means including a device in the suction conduit for causing a predetermined volume of fluid being supplied to the compressor and means for varying the volume of fluid in terms of conditions of the fluid including another suction conduit connected to the compressor at a point beyond the device as regards the direction of flow of fluid through the main suction conduit, valve means for regulating the volume of fluid passed through the other suction conduit, and means responsive to a condition of the fluid for controlling the valve means.

4. In combination with a centrifugal compressor having a suction conduit, a prime mover for driving the compressor, an adjustable governing mechanism including a flow responsive means having pipe means connected to the suction conduit for maintaining a predetermined flow of fluid through the suction conduit, and means for varying the flow of fluid in terms of pressure and/or temperature of the fluid supplied to the compressor, the last named means including an auxiliary conduit connected to the suction conduit at a point beyond the connection of the suction conduit with said pipe means as regards the direction of flow of fluid, a valve means in the auxiliary conduit, and means responsive to the pressure and/or temperature of the fluid for controlling the valve means.

In witness whereof, I have hereunto set my hand.

REGINALD G. STANDERWICK.